(12) United States Patent
Lindström et al.

(10) Patent No.: US 10,266,172 B2
(45) Date of Patent: Apr. 23, 2019

(54) PROPULSION SYSTEM FOR A VEHICLE

(71) Applicant: Scania CV AB, Södertälje (SE)

(72) Inventors: Johan Lindström, Nyköping (SE);
Mathias Björkman, Tullinge (SE);
Mikael Bergquist, Huddinge (SE);
Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 170 days.

(21) Appl. No.: 15/106,961

(22) PCT Filed: Dec. 22, 2014

(86) PCT No.: PCT/SE2014/051561
§ 371 (c)(1),
(2) Date: Jun. 21, 2016

(87) PCT Pub. No.: WO2015/099594
PCT Pub. Date: Jul. 2, 2015

(65) Prior Publication Data
US 2017/0001633 A1 Jan. 5, 2017

(30) Foreign Application Priority Data
Dec. 23, 2013 (SE) ........................................ 1351576

(51) Int. Cl.
*B60K 6/365* (2007.10)
*B60W 20/40* (2016.01)
(Continued)

(52) U.S. Cl.
CPC .............. *B60W 20/40* (2013.01); *B60K 1/02* (2013.01); *B60K 6/365* (2013.01); *B60K 6/46* (2013.01);
(Continued)

(58) Field of Classification Search
CPC ...................................................... B60K 6/365
See application file for complete search history.

(56) References Cited

U.S. PATENT DOCUMENTS

| | | |
|---|---|---|
| 5,433,282 A | 7/1995 | Moroto et al. |
| 5,492,189 A | 2/1996 | Kriegler et al. |

(Continued)

FOREIGN PATENT DOCUMENTS

| | | |
|---|---|---|
| DE | 19628000 A1 | 1/1997 |
| DE | 19838853 A1 | 3/1999 |

(Continued)

OTHER PUBLICATIONS

Machine translation of EP0552140 filed Aug. 1, 2018 (Year: 2018).*
(Continued)

*Primary Examiner* — Tisha D Lewis
(74) *Attorney, Agent, or Firm* — Moore & Van Allen PLLC; W. Kevin Ransom (57) ABSTRACT

A drive system for a vehicle includes two electrical machines arranged between a combustion engine and an input shaft to a gearbox. The first electrical machine rotor is connected with a planetary gear component, and the input shaft of the gearbox is connected with another planetary gear component. The second electrical machine rotor is connected via a transmission with the output shaft of the combustion engine, which is connected with another planetary gear component. planetary gear's components may be locked together to rotate at the same rotational speed, and released wherein the components rotate at different rotational speeds. Further, the output shaft of the combustion engine may either be locked in position with or released from the additional planetary gear component.

20 Claims, 2 Drawing Sheets

(51) Int. Cl.
*B60K 1/02* (2006.01)
*B60K 6/48* (2007.10)
*B60K 6/46* (2007.10)
*B60W 10/06* (2006.01)
*B60W 10/08* (2006.01)
*B60W 10/10* (2012.01)
*F16H 3/72* (2006.01)

(52) U.S. Cl.
CPC ............ *B60K 6/48* (2013.01); *B60W 10/06* (2013.01); *B60W 10/08* (2013.01); *B60W 10/10* (2013.01); *F16H 3/727* (2013.01); *B60K 2006/4825* (2013.01); *B60W 2710/125* (2013.01); *B60Y 2300/84* (2013.01); *Y02T 10/6221* (2013.01); *Y02T 10/6252* (2013.01); *Y10S 903/945* (2013.01)

(56) References Cited

U.S. PATENT DOCUMENTS

| | | | |
|---|---|---|---|
| 5,508,574 A | 4/1996 | Vlock | |
| 5,801,499 A | 9/1998 | Tsuzuki et al. | |
| 5,895,333 A | 4/1999 | Morisawa et al. | |
| 6,018,198 A * | 1/2000 | Tsuzuki | B60K 6/365 180/65.25 |
| 6,083,138 A | 7/2000 | Aoyama et al. | |
| 6,354,974 B1 | 3/2002 | Kozarekar | |
| 6,579,201 B2 | 6/2003 | Bowen | |
| 6,886,648 B1 | 5/2005 | Hata et al. | |
| 7,237,634 B2 | 7/2007 | Severinsky et al. | |
| 7,282,008 B2 * | 10/2007 | Oshidari | B60K 6/365 477/3 |
| 8,182,391 B2 | 5/2012 | Klemen et al. | |
| 8,403,807 B2 * | 3/2013 | Tabata | B60K 6/36 180/65.28 |
| 8,500,589 B2 | 8/2013 | Ortmann et al. | |
| 8,585,523 B2 | 11/2013 | Yamada | |
| 8,662,220 B2 | 3/2014 | Burkholder | |
| 8,840,502 B2 | 9/2014 | Bergquist | |
| 8,905,892 B1 | 12/2014 | Lee et al. | |
| 9,139,076 B2 | 9/2015 | Lee et al. | |
| 9,266,418 B2 | 2/2016 | Lee et al. | |
| 9,327,716 B2 | 5/2016 | Pettersson et al. | |
| 9,441,708 B2 | 9/2016 | Kimes et al. | |
| 9,592,821 B2 | 3/2017 | Pettersson et al. | |
| 9,623,004 B2 | 4/2017 | Kaytor et al. | |
| 9,643,481 B2 | 5/2017 | Goleski et al. | |
| 9,937,920 B2 * | 4/2018 | Lindstrom | B60K 1/02 |
| 2005/0049100 A1 | 3/2005 | Ai et al. | |
| 2007/0056784 A1 | 3/2007 | Joe et al. | |
| 2007/0102209 A1 | 5/2007 | Doebereiner | |
| 2007/0149334 A1 | 6/2007 | Holmes et al. | |
| 2008/0009380 A1 * | 1/2008 | Iwanaka | B60K 6/365 475/5 |
| 2008/0081734 A1 | 4/2008 | Duffy et al. | |
| 2008/0275625 A1 | 11/2008 | Snyder | |
| 2008/0318728 A1 | 12/2008 | Soliman et al. | |
| 2009/0075779 A1 | 3/2009 | Kumazaki et al. | |
| 2009/0076694 A1 | 3/2009 | Tabata et al. | |
| 2009/0145673 A1 | 6/2009 | Soliman et al. | |
| 2010/0035715 A1 | 2/2010 | Ortmann et al. | |
| 2010/0063660 A1 | 3/2010 | Uchida | |
| 2010/0099532 A1 | 4/2010 | Cashen | |
| 2012/0028757 A1 | 2/2012 | Kimura et al. | |
| 2012/0197475 A1 | 8/2012 | Akutsu et al. | |
| 2012/0244992 A1 | 9/2012 | Hisada et al. | |
| 2012/0245774 A1 | 9/2012 | Takami et al. | |
| 2013/0102429 A1 | 4/2013 | Kaltenbach et al. | |
| 2013/0109530 A1 | 5/2013 | Kaltenbach et al. | |
| 2013/0297134 A1 | 11/2013 | Saito et al. | |
| 2013/0316865 A1 | 11/2013 | Engström et al. | |
| 2014/0024490 A1 | 1/2014 | Bangura et al. | |
| 2014/0051537 A1 | 2/2014 | Liu et al. | |
| 2014/0121054 A1 | 5/2014 | Bergquist et al. | |
| 2014/0243149 A1 | 8/2014 | Holmes et al. | |
| 2015/0046009 A1 | 2/2015 | Maruyama et al. | |
| 2015/0051773 A1 | 2/2015 | Hayashi et al. | |
| 2015/0149012 A1 | 5/2015 | Pettersson et al. | |
| 2015/0239459 A1 | 8/2015 | Pettersson et al. | |
| 2015/0336569 A1 | 11/2015 | Matsubara et al. | |
| 2015/0375734 A1 | 12/2015 | Pettersson et al. | |
| 2016/0052381 A1 | 2/2016 | Kaltenbach et al. | |
| 2016/0159344 A1 | 6/2016 | Hata et al. | |
| 2016/0176396 A1 | 6/2016 | Hata et al. | |
| 2016/0288784 A1 | 10/2016 | Teraya et al. | |
| 2017/0001622 A1 | 1/2017 | Lindstrom et al. | |
| 2017/0001634 A1 | 1/2017 | Lindstrom et al. | |
| 2017/0043763 A1 | 2/2017 | Ketfi-Cherif et al. | |
| 2017/0144649 A1 | 5/2017 | Bangura et al. | |
| 2017/0282702 A1 | 10/2017 | Kim | |

FOREIGN PATENT DOCUMENTS

| | | | |
|---|---|---|---|
| DE | 19841829 A1 | 3/2000 | |
| DE | 102006054405 A1 | 6/2008 | |
| DE | 102007004458 A1 | 7/2008 | |
| DE | 102007004464 A1 | 7/2008 | |
| DE | 19628000 B4 | 1/2010 | |
| DE | 19838853 B4 | 11/2013 | |
| EP | 552140 A1 | 10/1995 | |
| EP | 552140 B1 | 10/1995 | |
| EP | 1145896 A1 | 10/2001 | |
| EP | 769404 A1 | 12/2001 | |
| EP | 1304249 A2 | 4/2003 | |
| EP | 1319546 A1 | 9/2004 | |
| EP | 1319546 B1 | 9/2004 | |
| EP | 2436546 A1 | 4/2012 | |
| FR | 2832356 A1 | 5/2003 | |
| JP | 07135701 A | 5/1995 | |
| JP | 11332018 A * | 11/1999 | ............ B60K 41/04 |
| JP | 3291871 B2 | 6/2002 | |
| SE | 1051384 A1 | 6/2012 | |
| SE | 536329 C2 | 8/2013 | |
| SE | 1200390 A1 | 12/2013 | |
| SE | 1200394 A1 | 12/2013 | |
| SE | 1250696 A1 | 12/2013 | |
| SE | 1250698 A1 | 12/2013 | |
| SE | 1250699 A1 | 12/2013 | |
| SE | 1250700 A1 | 12/2013 | |
| SE | 1250702 A1 | 12/2013 | |
| SE | 1250706 A1 | 12/2013 | |
| SE | 1250708 A1 | 12/2013 | |
| SE | 1250711 A1 | 12/2013 | |
| SE | 1250716 A1 | 12/2013 | |
| SE | 1250717 A1 | 12/2013 | |
| SE | 1250718 A1 | 12/2013 | |
| SE | 1250720 A1 | 12/2013 | |
| SE | 536559 C2 | 2/2014 | |
| WO | 0006407 A1 | 2/2000 | |
| WO | 0006407 A1 | 10/2000 | |
| WO | 2007113438 A1 | 10/2007 | |
| WO | 2007147732 A1 | 12/2007 | |
| WO | 2008016357 A2 | 2/2008 | |
| WO | 2011070390 A1 | 6/2011 | |
| WO | 2012091659 A1 | 7/2012 | |
| WO | 2013002707 A1 | 1/2013 | |

OTHER PUBLICATIONS

International Search Report for PCT/SE2014/051561 dated Apr. 22, 2015.
European Search Report from the European Patent Office for PCT/SE2014/051561 dated Jul. 25, 2017.
Written Opinion of the International Search Authority for PCT/SE14/051561 dated Apr. 22, 2015.
European Search Report for PCT/SE2014/051561 dated Jul. 25, 2017.
International Preliminary Report on Patentability for PCT/SE2014/051561 dated Jun. 28, 2016.

* cited by examiner

PROPULSION SYSTEM FOR A VEHICLE

CROSS REFERENCE TO RELATED APPLICATIONS

This application is a national stage application (filed under 35 § U.S.C. 371) of PCT/SE2014/051561, filed Dec. 22, 2014 of the same title, which, in turn, claims priority to Swedish Application No. 1351576-2, filed Dec. 23, 2013 of the same title; the contents of each of which are hereby incorporated by reference.

FIELD OF THE INVENTION

The present invention relates to a drive system for a vehicle, and is particularly, but not exclusively, focused on such a drive system in motor vehicles in the form of wheeled commercial vehicles, especially heavy goods vehicles such as trucks and buses. The invention thus relates to a drive system for driving a hybrid vehicle which, generally, is a vehicle that may be powered by a primary engine, in this case a combustion engine, and a secondary engine, in this case an electrical machine. The vehicle is suitably equipped with means for storage of energy, such as a battery or a capacitor for storage of electric energy, and control equipment to control the flow of electric energy between the means and the electrical machine. The electrical machine may thus alternately operate as an engine or as a generator, depending on the vehicle's operating mode. When the vehicle decelerates, the electrical machine generates energy that may be stored, and the stored electric energy is used later for e.g. operation of the vehicle.

BACKGROUND OF THE INVENTION

Using a conventional clutch mechanism, which disconnects the input shaft of the gearbox from the combustion engine during a shifting process in the gearbox, entails disadvantages, such as heating of the clutch mechanism's discs, which results in an increased fuel consumption and wear of the clutch discs. There are also large losses as a result, in particular when the vehicle is started. A conventional clutch mechanism is also relatively heavy and costly. It also occupies a relatively large space in the vehicle. Friction losses also arise at the use of a hydraulic converter/torque converter commonly used in automatic transmission. By ensuring that the vehicle has a drive system in which the output shaft of the combustion engine, the rotor of the electrical machine and the input shaft of the gearbox are connected with a planetary gear, the conventional clutch mechanism and disadvantages associated therewith may be avoided. A vehicle with a drive system of this type constitutes prior art, as set out in EP 1 319 546 and SE 1051384-4.

Although this drive system, especially the one described in SE 1051384-4, functions well and has a range of advantageous features, efforts are constantly made to improve such a drive system with respect to its behavior and function in certain operating situations.

SUMMARY OF THE INVENTION

The objective of the present invention is to show a drive system of the type defined above, which is in line with the above-mentioned efforts. This objective is achieved according to the invention by providing a drive system.

By equipping the drive system with a second electrical machine and said second locking means, an improved behavior is obtained in a range of operational situations compared to such prior art drive systems. Specifically, when braking the vehicle it becomes possible to have the first locking means in a release position, without being limited by the reaction torque with which the combustion engine may resist. It also becomes possible to start the combustion engine when the torque is transmitted through the powertrain, i.e. out of the gearbox. When the vehicle is at a standstill it also becomes possible to drive while maintaining a power balance, i.e. while supplying an energy storage means, such as a battery, and other electrical loads of the vehicle with a controlled current/power while a desired torque is maintained in the powertrain. Under most circumstances this is not achievable in prior art drive systems of this type.

"Electric energy storage"/"storage of electric energy"/"energy storage", as used in this document, means an energy storage means with an electrical interface in relation to the first and second electrical machine of the drive system, but storage of energy does not have to be electrical. This entails that in addition to an electrical battery and capacitor, e.g. flywheels, other mechanical means and means for building up pressure, e.g. pneumatic or hydraulic, may be possible.

According to one embodiment of the invention, said second locking means are adapted to, in said release position, separate a first part of the combustion engine's output shaft. arranged nearest the combustion engine, from a second part thereof, connected with said first component of the planetary gear, and the transmission between the second electrical machine's rotor and the combustion engine's output shaft is connected with said first part.

According to another embodiment of the invention, the combustion engine's output shaft, the first electrical machine's rotor and the input shaft of the gearbox are rotatably arranged around a common rotation axis, and the second electrical machine's rotor is rotatably arranged around a rotation axis, which is substantially parallel therewith or parallel with said common axis.

According to another embodiment of the invention, the planetary gear's sun wheel constitutes said first component and the ring gear constitutes said third component. By connecting the first electrical machine's rotor with the ring gear and the combustion engine's output shaft with the sun wheel, a compact construction is achieved, which is easy to fit into already existing spaces for powertrains (drive systems) with clutch mechanisms instead of planetary gears. A hybrid gearbox may thus be made compact and substantially no bulkier than a standard gearbox. This entails that the weight increase, which a hybridization normally involves, may be reduced considerably. Another advantage is that a connection of the first electrical machine's rotor with the ring gear provides a higher potential braking torque via the rotor, than if this were connected with the sun wheel instead.

According to another embodiment of the invention, the drive system comprises at least one control device, adapted to control the fuel supply to the combustion engine and to control the exchange of electric energy between the first and second electrical machine, on the one hand, and, on the other hand, electric energy storage means. The control device is advantageously also adapted to control said locking means to be moved between said locked position and release position, and, in order to lock them together, to control the combustion engine and/or the first electrical machine and/or the second electrical machine to achieve the same rotational speed in the parts to be locked together by the respective locking means and, subsequently, to move the locking means to a locked position, and, in order to release them, to control the combustion engine and/or the first electrical machine and/or the second electrical machine to achieve a torque balance between the parts to be released from each other and, subsequently, for the locking means to be moved to a release position.

Figure 3:
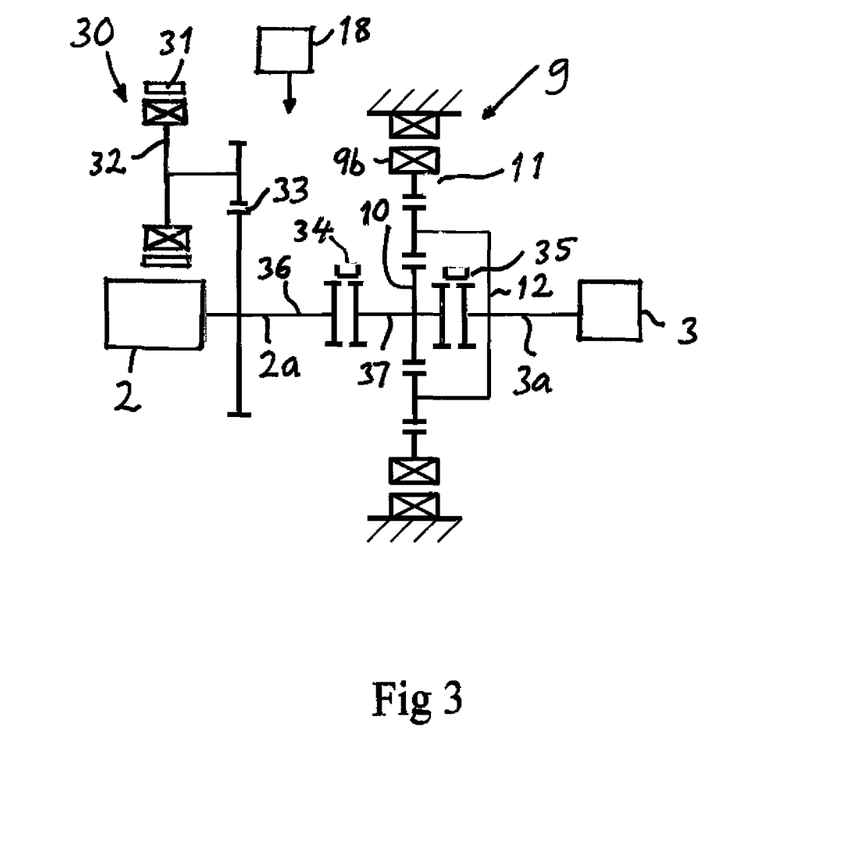
FIG. 3 is a simplified view illustrating the general structure of a drive system according to one embodiment of the invention.

Here, torque balance is achieved when the following relation between the torques applied is met for the example configuration displayed in FIG. 3:

$$T_{sun\ wheel} = \frac{Z_s}{Z_r} T_{ring\ gear}$$

where $T_{sun\ wheel}$ and $T_{ring\ gear}$ constitute torque applied on the sun wheel and the ring gear, respectively, $Z_s$ is the number of teeth of the sun wheel, $Z_r$ is the number of teeth of the ring gear.

Accordingly, torque balance means the state where a torque acts on a ring gear arranged in the planetary gear, corresponding to the product of the torque acting on the planetary gear's planetary wheel carrier and the planetary gear's gear ratio, while simultaneously a torque acts on the planetary gear's sun wheel, corresponding to the product of the torque acting on the planetary wheel carrier and (1 minus the planetary gear's gear ratio). At such torque balance, said first locking means 34 does not transfer any torque between the components of the planetary gear.

According to another embodiment of the invention, the control device is adapted to control, when the vehicle is driven with the combustion engine shut off, the first locking means in a locked position. and the second locking means in a release position for start of the combustion engine, the second electrical machine towards and to the combustion engine's idling engine speed and injection of fuel into the combustion engine, the combustion engine and the first and second electrical machine towards and to the same rotational speed of the combustion engine's output shaft, and said first component in the planetary gear, and the second locking means to be moved into a locked position.

Since the start of the combustion engine is entirely disconnected from the propulsion, no torque needs to be ramped away during the start of the combustion engine, which may occur with a maintained propulsion force in the drive system.

According to another embodiment of the invention, the control device is adapted to control, when the vehicle is driven with the combustion engine running and the second locking means in a locked position for turning off of the combustion engine, and a transition to powering the vehicle with the electrical machines, the combustion engine and the second electrical machine's rotor towards and to the engine speed of the input shaft of the gearbox, if the first locking means are in a release position, the first locking means to be moved into a locked position if it is not already there, the combustion engine and the second electrical machine, so that a zero torque is transmitted via the second locking means, the second locking means to be moved to the release position, cessation of injection of fuel into the combustion engine, and the second electrical machine towards and to a standstill.

Accordingly, controlled stopping of the combustion engine is achieved, at which its engine speed may be controlled in such a manner that vibration is avoided. Such a stop may be carried out without the torque in the powertrain, i.e. the torque transmitted to the input shaft of the gearbox and further downstream of the gearbox, disappearing, i.e. without any torque interruption.

According to another embodiment of the invention, the control device is adapted to control, when the vehicle is at a standstill with the combustion engine running at idling speed, the first locking means in a release position, and the second locking means in a locked position for driving of the vehicle with power balance, the first electrical machine for delivery of a torque thereof, so that the requested torque is transmitted to the input shaft of the gearbox, the combustion engine towards and to its idling speed, the second electrical machine to deliver a torque so that the desired power to the energy storage means and the electrical load comprised in the vehicle is achieved, in case the torque available in the combustion engine at idling speed is insufficient to counteract both the reaction torque from the first electrical machine and the torque applied from the second electrical machine, to increase the engine speed of the combustion engine in order to increase the torque available from the combustion engine, and the first locking means to be moved to a locked position when the input shaft of the gearbox, the first electrical machine's rotor and the combustion engine's output shaft rotate with the same rotational speed.

As long as none of the combustion engine, the first electrical machine and the second electrical machine achieve their performance limits, both the desired torque and the desired electrical power may be achieved at such start of driving. If the torque available in the combustion engine is insufficient, the engine speed may be increased or the output target may be abandoned. If the second electrical machine reaches its limit, the output target must be abandoned. Abandoning the output target entails that the electrical energy storage means must deliver a current to the first electrical machine and to electrical loads. This is usually possible, although not desirable. Initially, the rotor rotates backwards in the first electrical machine during the start, and generates power when a positive torque must be achieved. In some cases it may be difficult for a battery to receive the power generated, e.g. at low temperatures of the battery, but in such case this output may be consumed by the second electrical machine, by way of it delivering a torque that helps the combustion engine's output shaft to rotate.

According to another embodiment of the invention, the control device is adapted to control, when the vehicle is driven with the combustion engine running, and the first and second locking means in a locked position, when braking the vehicle towards stop, the desired braking torque to be distributed between the first and second electrical machines, when a certain value of the vehicle's speed is not met, the first and second electrical machine so that torque balance is achieved in the planetary gear, at the same time as the total torque transmitted to the input shaft of the gearbox corresponds to the desired braking torque, the first locking means to be moved to the release position, the combustion engine towards and to its idling engine speed, and the fuel injection into the combustion engine to cease, and ramping down of the total braking torque from the first and second electrical machine towards zero in connection with the vehicle stopping.

With two electrical machines, the desired braking torque may usually be achieved without any requirement to shift gears while braking. Since gear shifting is avoided, no braking energy is lost due to torque from an electrical machine being ramped down to prepare for a gear shift. The first locking means may be moved to the release position and kept in this position while simultaneously the desired braking torque may be maintained. Accordingly, the fraction of braking energy that may be regenerated with a hybrid system is greatly increased.

The invention also relates to a vehicle, and methods with the method steps that the control device is adapted to carry out in the above-mentioned embodiments of the drive system according to the invention.

Other advantageous features and advantages of the invention are set out in the description below.

BRIEF DESCRIPTION OF THE DRAWINGS

Below are descriptions of an example embodiment of the invention with reference to the enclosed drawings, in which.

DETAILED DESCRIPTION OF THE INVENTION

Figure 1:
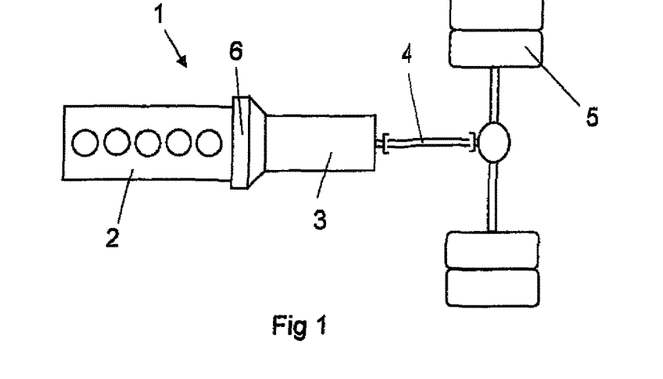
FIG. 1 is a very simplified view of a powertrain in a vehicle, which may be equipped with a drive system according to the invention.
Figure 2:
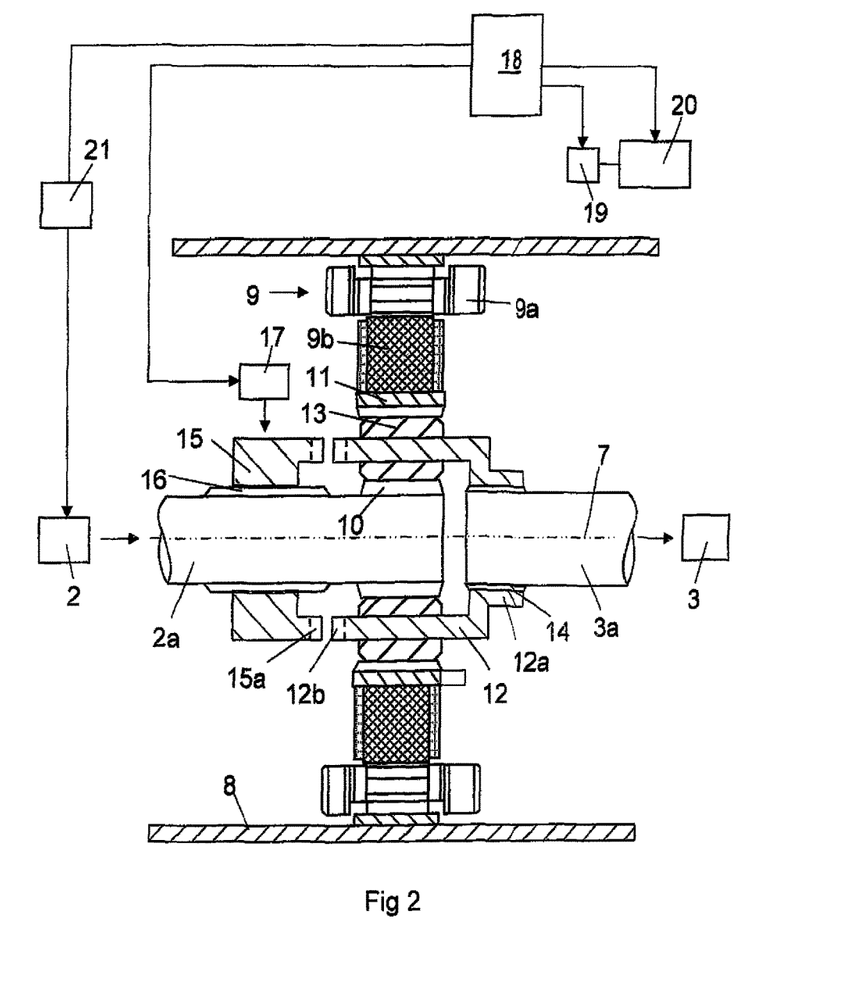
FIG. 2 is a more detailed, but still simplified view of a part of said drive system.

FIG. 1 shows a powertrain for a heavy goods vehicle 1. The powertrain comprises a combustion engine 2, a gearbox 3, a number of driving shafts 4 and driving wheels 5. Between the combustion engine 2 and the gearbox 3, the powertrain comprises an intermediate section 6. FIG. 2 shows a part of the components in the intermediate section 6 in more detail, more specifically those that also occur in prior art drive systems, such as the one according to SE 1051384-4. The combustion engine 2 is equipped with an output shaft 2a, and the gearbox 3 with an input shaft 3a in the intermediate section 6. The output shaft 2a of the combustion engine is coaxially arranged in relation to the input shaft 3a of the gearbox. The combustion engine's output shaft 2a and the input shaft 3a of the gearbox are rotatably arranged around a common rotation axis 7. The intermediate section 6 comprises a house 8, enclosing a first electrical machine 9 and a planetary gear. The electrical machine 9 comprises, in a customary manner, a stator 9a and a rotor 9b. The stator 9a comprises a stator core which is mounted in a suitable manner on the inside of the house 8. The stator core comprises the stator's windings. The first electrical machine 9 is adapted, under certain operating circumstances, to use stored electrical energy to supply driving force to the input shaft 3a of the gearbox, and, under other operating conditions, to use the kinetic energy of the input shaft 3 of the gearbox to extract and store electric energy.

The planetary gear is arranged substantially radially on the inside in relation to the electrical machine's stator 9a and rotor 9b. The planetary gear comprises, in a customary manner, a sun wheel 10, a ring gear 11 and a planetary wheel carrier 12. The planetary wheel carrier 12 supports a number of cogwheels 13, which are rotatably arranged in a radial space between the teeth of the sun wheel 10 and the ring gear 11. The sun wheel 10 is fixed on a peripheral surface of the combustion engine's output shaft 2a. The sun wheel 10 and the combustion engine's output shaft 2a rotate as one unit with a first rotational speed n1. The planetary wheel carrier 12 comprises an attachment section 12a, which is attached on a peripheral surface of the input shaft 3a of the gearbox with the help of a splines joint 14. With the help of this joint, the planetary wheel carrier 12 and the input shaft 3a of the gearbox may rotate as one unit with a second rotational speed n2. The ring gear 11 comprises an external peripheral surface on which the rotor 9b is fixedly mounted. The rotor 9b and the ring gear 11 constitute a rotatable unit that rotates with a third rotational speed n3.

The drive system comprises a first locking means, since the combustion engine's output shaft 2a is equipped with a shiftable clutch element 15. The clutch element 15 is mounted on the combustion engine's output shaft 2a with the help of a splines joint 16. The clutch element 15 is in this case arranged in a twist-fast manner on the combustion engine's output shaft 2a, and is shiftably arranged in an axial direction on the combustion engine's output shaft 2a. The clutch element 15 comprises a clutch section 15a, which is connectible with a clutch section 12b in the planetary wheel carrier 12. A schematically displayed shifting element 17 is adapted to shift the clutch element 15 between a first position where the clutch sections 15a, 12b are not in engagement with each other, corresponding to a release position in the first locking means, and a second position where the clutch sections 15a, 12b are in engagement with each other, corresponding to a locked position of the first locking means. In this locked position the combustion engine's output shaft 2a and the input shaft 3a of the gearbox will be locked together, and these, as well as the electrical machine's rotor, will thus rotate at the same rotational speed. This state may be referred to as a locked planet. The locking mechanism may, advantageously, also have the design which is described in the not yet public Swedish patent application 1250696-0, and comprise a sleeve equipped with first splines, which splines, in the release position, engage with second splines on a first component of the planetary gear and, in the locked position, engage with third splines on a second component of the planetary gear. In this case, the first component is preferably the planetary wheel carrier, and the second component is the sun wheel. The locking mechanism may then be adapted like an annular sleeve, enclosing the planetary wheel carrier substantially concentrically. The locking means may also consist of a suitable type of friction clutch.

An electric control device 18 is adapted to control the shifting element 17. The control device 18 is also adapted to determine the occasions on which the electrical machine should operate as an engine, and on which occasions it should operate as a generator. To determine this, the control device 18 may receive up-to-date information relating to suitable operating parameters. The control device 18 may be a computer with software for this purpose. The control device 18 controls a schematically displayed control equipment 19, which controls the flow of electric energy between a hybrid battery 20 and the stator windings 9a of the electrical machine. On occasions where the electrical machine 9 operates as an engine, stored electric energy is supplied from the hybrid battery 20 to the stator 9a. On occasions where the electrical machine operates as a generator, electric energy is supplied from the stator 9a to the hybrid battery 20. The hybrid battery 20 delivers and stores electric energy with a voltage in the range of 300-900 volts. Since the intermediate section 6 between the combustion engine 2 and the gearbox 3 in the vehicle is limited, the electrical machine 9 and the planetary gear must constitute a compact unit. The planetary gear's components 10, 11, 12 are arranged substantially radially inside the electrical machine's stator 9a. The rotor 9b of the electrical machine, the ring gear 11 of the planetary gear, the combustion engine's output shaft 2a, and the input shaft 3a of the gearbox, are here rotatably arranged around a common rotation axis 5. With such an embodiment, the electrical machine 9 and the planetary gear occupy a relatively small area. The vehicle 1 is equipped with an engine control function 21 with which the engine speed n1 of the combustion engine 2 may be controlled. The control device 18 thus has the possibility of activating the engine control function 21 and of creating a substantially zero torque state in the gearbox 3 at engagement and disengagement of gears in the gearbox 3. The drive system may also, instead of being controlled by one single control device 18, be controlled by several different control devices.

The part of the drive system according to the invention described thus far and displayed in FIG. 2 is present in the drive system according to SE 1051384-4. Below, the part of the drive system according to the invention, which has been added to this part, will be described with reference to FIG. 3.

According to the invention, the drive system, specifically the intermediate section 6, also has a second electrical machine 30 with a stator 31 and a rotor 32, connected with the combustion engine's output shaft 2a via a transmission 33. Such transmission 33 may have a constant gearing, but it may also comprise a possibility to vary its gearing. According to one example, the gearing for the transmission 33 may be varied between at least two discrete gear steps. According to another example, the transmission 33 consists of a mechanism for a continuously variable gearing. The possibility to vary the gearing for the transmission 33, in discrete steps or continuously, may be used to achieve an advantageous resulting torque and/or rotational speed from the second electrical machine. A second locking means 34, which may have a similar design as the first locking means 35, illustrated in more detail in FIG. 2, is adapted to, in a release position, separate a first part 36 of the combustion engine's output shaft 2a, arranged nearest the combustion engine, from a second part 37 thereof, connected with the sun wheel 10 of the planetary gear, so that the combustion engine's output shaft 2a is disconnected from the sun wheel 10. The second locking means 34 may be moved to a locked position, in which the combustion engine's output shaft 2a is locked to the sun wheel 10. The control device 18 is adapted to control fuel supply to the combustion engine 2 and to control the exchange of electric energy between the first electrical machine 9 and the second electrical machine 30 on the one hand, and, on the other hand, electric energy storage means such as batteries.

A range of positive features of the drive system are achieved by way of the added arrangement of the second electrical machine 30 and the second locking means 34, some of the most important of which have been described in the introduction of this document. For example, the combustion engine 2 may be started when the vehicle is driven via electrical drive, without any torque in the powertrain disappearing, i.e. without any torque interruption, since such torque is achieved with the first electrical machine 9 while the second electrical machine may be controlled to the combustion engine's idling speed, and following synchronization of the rotational speeds on either sides of the second locking means 34, the latter may then be moved to the locked position. Likewise, when the vehicle is in operation with the combustion engine running, it may be turned off and stopped without any torque in the powertrain disappearing. The possibilities of achieving power balance are also considerably improved, thanks to the addition of the second electrical machine and the second locking means, wherein at such power balance, the sum of the desired current to/from electrical energy storage means and electrical loads may be both negative and positive. The term power balance means that it is possible, within the general limitations specified for the drive system, to freely choose charge current to, or discharge current from, the energy storage means/hybrid battery at all operating modes occurring. It is especially advantageous that it is possible to start driving the vehicle equipped with the drive system, even though the batteries of the vehicle, which constitute its electrical energy storage system, are very cold and may not receive any current. At the start of the vehicle, the first electrical machine 9 rotates backwards and thus generates power when a positive torque must be achieved. The power generated may in such case not be received by the battery, but it may be consumed by the second electrical machine 30, since the latter applies a torque on the output shaft of the combustion engine, and helps to rotate such output shaft.

The advantages described above are achieved also at braking of a vehicle, which initially drives at e.g. a speed of approximately 50 km/h with the combustion engine running, since the drive system according to the invention has two electrical machines. Accordingly, torque balance may usually be reached in the planetary gear without any reduction of the total braking torque being required. The same total braking torque may then be maintained when the first locking means is moved to the release position, i.e. the planetary gear is unlocked, and the combustion engine is controlled to its idling engine speed. Therefore, it is often advantageous to brake in one and the same gear all the way until the vehicle stops, which is facilitated in the drive system according to the invention.

The invention is obviously not limited in any way to the embodiments described above, but numerous possible modifications thereof should be obvious to a person skilled in the area, without such person departing from the spirit of the invention as defined by the appended claims.

The first locking means may be adapted to lock together any two of said three components.

A transmission could be arranged between the rotor and the ring gear, and also between the combustion engine's output shaft and the sun wheel, such as upstream of the shaft which is displayed in FIG. 2 to be connected with the sun wheel. The latter transmission could also consist of a variable gear.

It is also conceivable that the drive system has the ring gear as the first component and the sun wheel as the third component, even if the reverse would be preferable because of the advantages mentioned above.

The drive system according to the present application may, at least in some situations, also be advantageously used where no energy storage means/hybrid battery is comprised. In applicable situations, energy is then instead exchanged, only between the first electrical machine and the second electrical machine. One example of an application of this method is the replacement of the function of a traditional coupling device (typically, a friction coupling) or a hydraulic torque converter where such is normally exposed to high heat development and/or wear. Advantageously, a traditional friction coupling in a heavy tractor may, according to the present application, e.g. be replaced with a drive system that does not comprise any energy storage means/hybrid battery. Another example of an application where the drive system according to the present application may be used without comprising any energy storage means/hybrid battery is at the implementation of shifting, when the drive system may be used to control/adjust/regulate the torque and/or rotational speed of the input shaft of the gearbox and/or of the output shaft/flywheel of the combustion engine to carry out shifting in an advantageous manner. Energy is therefore exchanged only between the first electrical machine and the second electrical machine.

The invention claimed is:

1. A drive system for a vehicle, wherein the drive system comprises:
   an output shaft in a combustion engine;
   an input shaft of a gearbox;
   a first electrical machine comprising a stator and a rotor;
   a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of such third of said components;
   a first locking means, which may be moved between a locked position in which two of said components are locked together, so that the three components rotate with the same rotational speed, and a release position in which the components are allowed to rotate at different rotational speeds;
   a second electrical machine with a stator and a rotor, connected via a transmission with the output shaft of the combustion engine;
   a second locking means, which may be moved between a locked position in which the combustion engine's output shaft is locked to said first of said components, and a release position in which the combustion engine's output shaft is disconnected from said first of said components; and
   at least one control device, adapted to control fuel supply to the combustion engine and to control exchange of electrical energy between the first and second electrical machine, on the one hand, and storage means of electric energy on the other hand, wherein the control device is adapted to control said first and second locking means to be moved between said locked position and release position and, in order to lock, to control the combustion engine, and/or the first electrical machine, and/or the second electrical machine to achieve the same rotational speed in the parts to be locked together by the respective first and second locking means, and, subsequently, the first and second locking means to be moved to a locked position, and, in order to release, to control the combustion engine, and/or the first electrical machine, and/or the second electrical machine to achieve torque balance between the parts to be released from each other and, subsequently, the first and second locking means to be moved to a release position, and
   wherein the control device is adapted to control, when the vehicle is driven with the combustion engine turned off, the first locking means in a locked position, and the second locking means in a release position for start of the combustion engine,
   the second electrical machine towards and to the combustion engine's idling engine speed, and injection of fuel into the combustion engine;
   the combustion engine, and the first and second electrical machine, towards and to the same rotational speed of the output shaft of the combustion engine, and said first component in the planetary gear; and
   the second locking means to be moved into a locked position.

2. A drive system for a vehicle, wherein the drive system comprises:
   an output shaft in a combustion engine;
   an input shaft of a gearbox;
   a first electrical machine comprising a stator and a rotor;
   a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of such third of said components;
   a first locking means, which may be moved between a locked position in which two of said components are locked together, so that the three components rotate with the same rotational speed, and a release position in which the components are allowed to rotate at different rotational speeds;
   a second electrical machine with a stator and a rotor, connected via a transmission with the output shaft of the combustion engine;
   a second locking means, which may be moved between a locked position in which the combustion engine's output shaft is locked to said first of said components, and a release position in which the combustion engine's output shaft is disconnected from said first of said components; and
   at least one control device, adapted to control fuel supply to the combustion engine and to control exchange of electrical energy between the first and second electrical machine, on the one hand, and storage means of electric energy on the other hand, wherein the control device is adapted to control said first and second locking means to be moved between said locked position and release position and, in order to lock, to control the combustion engine, and/or the first electrical machine, and/or the second electrical machine to achieve the same rotational speed in the parts to be locked together by the respective first and second locking means, and, subsequently, the first and second locking means to be moved to a locked position, and, in order to release, to control the combustion engine, and/or the first electrical machine, and/or the second electrical machine to achieve torque balance between the parts to be released from each other and, subsequently, the first and second locking means to be moved to a release position, and wherein the control device is adapted to control, when the vehicle is driven with the combustion engine running, and with the second locking means in the locked position in order to turn off the combustion engine and transition to the vehicle being powered by the electrical machines, the combustion engine and the rotor of the second electrical machine towards and to the engine speed of the input shaft of the gearbox, if the first locking means is in a release position;

the first locking means to be moved to a locked position if it is not already there;

the combustion engine and the second electrical machine, so that a zero torque is transmitted via the second locking means;

the second locking means to be moved to the release position;

cessation of injection of fuel into the combustion engine; and the second electrical machine towards and to a standstill.

3. A drive system for a vehicle, wherein the drive system comprises:
an output shaft in a combustion engine;
an input shaft of a gearbox;
a first electrical machine comprising a stator and a rotor;
a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of such third of said components;
a first locking means, which may be moved between a locked position in which two of said components are locked together, so that the three components rotate with the same rotational speed, and a release position in which the components are allowed to rotate at different rotational speeds;
a second electrical machine with a stator and a rotor, connected via a transmission with the output shaft of the combustion engine;
a second locking means, which may be moved between a locked position in which the combustion engine's output shaft is locked to said first of said components, and a release position in which the combustion engine's output shaft is disconnected from said first of said components; and
at least one control device, adapted to control fuel supply to the combustion engine and to control exchange of electrical energy between the first and second electrical machine, on the one hand, and storage means of electric energy on the other hand, wherein the control device is adapted to control said first and second locking means to be moved between said locked position and release position and, in order to lock, to control the combustion engine, and/or the first electrical machine, and/or the second electrical machine to achieve the same rotational speed in the parts to be locked together by the respective first and second locking means, and, subsequently, the first and second locking means to be moved to a locked position, and, in order to release, to control the combustion engine, and/or the first electrical machine, and/or the second electrical machine to achieve torque balance between the parts to be released from each other and, subsequently, the first and second locking means to be moved to a release position, and wherein the control device is adapted to control, when the vehicle is at a standstill with the combustion engine running at idling engine speed, the first locking means is in a release position, and the second locking means in a locked position in order to start driving the vehicle with power balance, the first electrical machine to delivery of a torque thereof, so that the requested torque is transmitted to the input shaft of the gearbox;

the combustion engine towards and to its idling speed;

the second electrical machine to deliver a torque, so that the desired power to the energy storage means and electrical loads comprised in the vehicle are achieved;

in case the torque available in the combustion engine at idling speed is insufficient to both counteract the reaction torque from the first electrical machine, and the torque applied from the second electrical machine, to increase the engine speed of the combustion engine, in order to increase the torque available from the combustion engine; and the first locking means to be moved to a locked position, when the input shaft of the gearbox, the rotor of the first electrical machine and the output shaft of the combustion engine rotate with the same rotational speed.

4. A drive system for a vehicle, wherein the drive system comprises:
an output shaft in a combustion engine;
an input shaft of a gearbox;
a first electrical machine comprising a stator and a rotor;
a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of such third of said components;
a first locking means, which may be moved between a locked position in which two of said components are locked together, so that the three components rotate with the same rotational speed, and a release position in which the components are allowed to rotate at different rotational speeds;
a second electrical machine with a stator and a rotor, connected via a transmission with the output shaft of the combustion engine;
a second locking means, which may be moved between a locked position in which the combustion engine's output shaft is locked to said first of said components, and a release position in which the combustion engine's output shaft is disconnected from said first of said components; and at least one control device, adapted to control fuel supply to the combustion engine and to control exchange of electrical energy between the first and second electrical machine, on the one hand, and storage means of electric energy on the other hand, wherein the control device is adapted to control said first and second locking means to be moved between said locked position and release position and, in order to lock, to control the combustion engine, and/or the first electrical machine, and/or the second electrical machine to achieve the same rotational speed in the parts to be locked together by the respective first and second locking means, and, subsequently, the first and second locking means to be moved to a locked position, and, in order to release, to control the combustion engine, and/or the first electrical machine, and/or the second electrical machine to achieve torque balance between the parts to be released from each other and, subsequently, the first and second locking means to be moved to a release position, and wherein the control device is adapted to control, when the vehicle is driven with the combustion engine running, and with the first and second locking means in a locked position at braking of the vehicle towards stop, the desired braking torque to be distributed between the first and second electrical machines;

when a certain value of the vehicle's speed is not met, the first and second electrical machine, so that torque balance is achieved in the planetary gear, at the same time as the total torque transmitted to the input shaft of the gearbox corresponds to the desired braking torque;

the first locking means to be moved to the release position;

the combustion engine towards and to its idling engine speed, and the fuel injection into the combustion engine to cease; and ramping down of the total braking torque from the first and second electrical machine towards zero in connection with the vehicle stopping.

5. A vehicle comprising a drive system wherein the drive system comprises:

an output shaft in a combustion engine;

an input shaft of a gearbox;

a first electrical machine comprising a stator and a rotor;

a planetary gear comprising three components in the form of a sun wheel, a ring gear and a planetary wheel carrier, wherein the output shaft of the combustion engine is connected with a first of said components in the planetary gear, so that a rotation of such shaft leads to a rotation of such first of said components, wherein the input shaft of the gearbox is connected with a second of said components of the planetary gear, so that a rotation of such shaft leads to a rotation of such second of said components, and wherein the rotor of the electrical machine is connected with a third of said components in the planetary gear, so that a rotation of the rotor leads to a rotation of such third of said components;

a first locking means, which may be moved between a locked position in which two of said components are locked together, so that the three components rotate with the same rotational speed, and a release position in which the components are allowed to rotate at different rotational speeds;

a second electrical machine with a stator and a rotor, connected via a transmission with the output shaft of the combustion engine;

a second locking means, which may be moved between a locked position in which the combustion engine's output shaft is locked to said first of said components, and a release position in which the combustion engine's output shaft is disconnected from said first of said components; and at least one control device, adapted to control fuel supply to the combustion engine and to control exchange of electrical energy between the first and second electrical machine, on the one hand, and storage means of electric energy on the other hand, wherein the control device is adapted to control said first and second locking means to be moved between said locked position and release position and, in order to lock, to control the combustion engine, and/or the first electrical machine, and/or the second electrical machine to achieve the same rotational speed in the parts to be locked together by the respective first and second locking means, and, subsequently, the first and second locking means to be moved to a locked position, and, in order to release, to control the combustion engine, and/or the first electrical machine, and/or the second electrical machine to achieve torque balance between the parts to be released from each other and, subsequently, the first and second locking means to be moved to a release position, and wherein the control device is adapted to control, when the vehicle is at a standstill with the combustion engine running at idling engine speed, the first locking means is in a release position, and the second locking means in a locked position in order to start driving the vehicle with power balance, the first electrical machine to delivery of a torque thereof, so that the requested torque is transmitted to the input shaft of the gearbox;

the combustion engine towards and to its idling speed;

the second electrical machine to deliver a torque, so that the desired power to the energy storage means and electrical loads comprised in the vehicle are achieved;

in case the torque available in the combustion engine at idling speed is insufficient to both counteract the reaction torque from the first electrical machine, and the torque applied from the second electrical machine, to increase the engine speed of the combustion engine, in order to increase the torque available from the combustion engine; and the first locking means to be moved to a locked position, when the input shaft of the gearbox, the rotor of the first electrical machine and the output shaft of the combustion engine rotate with the same rotational speed.

6. The drive system according to claim 1, wherein said second locking means is adapted to, in said release position, separate a first part, arranged in said combustion engine, of the output shaft of the combustion engine from a second part thereof, connected with said first of said components of the planetary gear, and in that the transmission between the rotor of the second electrical machine and the output shaft of the combustion engine is connected with said first part.

7. The drive system according to claim 1, wherein the output shaft of the combustion engine, the rotor of the first electrical machine and the input shaft of the gearbox are rotatably arranged around a common rotation axis, and the rotor of the second electrical machine is rotatably arranged around a rotation axis, which is substantially parallel therewith or parallel with said common axis.

8. The drive system according to claim 1, wherein the planetary gear's sun wheel is said first of said components and the ring gear is said third of said components.

9. The drive system according to claim 2, wherein said second locking means is adapted to, in said release position, separate a first part, arranged in said combustion engine, of the output shaft of the combustion engine from a second part thereof, connected with said first of said components of the planetary gear, and in that the transmission between the rotor of the second electrical machine and the output shaft of the combustion engine is connected with said first part.

10. The drive system according to claim 2, wherein the output shaft of the combustion engine, the rotor of the first electrical machine and the input shaft of the gearbox are rotatably arranged around a common rotation axis, and the rotor of the second electrical machine is rotatably arranged around a rotation axis, which is substantially parallel therewith or parallel with said common axis.

11. The drive system according to claim 2, wherein the planetary gear's sun wheel is said first of said components and the ring gear is said third of said components.

12. The drive system according to claim 3, wherein said second locking means is adapted to, in said release position, separate a first part, arranged in said combustion engine, of the output shaft of the combustion engine from a second part thereof, connected with said first of said components of the planetary gear, and in that the transmission between the rotor of the second electrical machine and the output shaft of the combustion engine is connected with said first part.

13. The drive system according to claim 3, wherein the output shaft of the combustion engine, the rotor of the first electrical machine and the input shaft of the gearbox are rotatably arranged around a common rotation axis, and the rotor of the second electrical machine is rotatably arranged around a rotation axis, which is substantially parallel therewith or parallel with said common axis.

14. The drive system according to claim 3, wherein the planetary gear's sun wheel is said first of said components and the ring gear is said third of said components.

15. The drive system according to claim 4, wherein said second locking means is adapted to, in said release position, separate a first part, arranged in said combustion engine, of the output shaft of the combustion engine from a second part thereof, connected with said first of said components of the planetary gear, and in that the transmission between the rotor of the second electrical machine and the output shaft of the combustion engine is connected with said first part.

16. The drive system according to claim 4, wherein the output shaft of the combustion engine, the rotor of the first electrical machine and the input shaft of the gearbox are rotatably arranged around a common rotation axis, and the rotor of the second electrical machine is rotatably arranged around a rotation axis, which is substantially parallel therewith or parallel with said common axis.

17. The drive system according to claim 4, wherein the planetary gear's sun wheel is said first of said components and the ring gear is said third of said components.

18. The drive system according to claim 5, wherein said second locking means is adapted to, in said release position, separate a first part, arranged in said combustion engine, of the output shaft of the combustion engine from a second part thereof, connected with said first of said components of the planetary gear, and in that the transmission between the rotor of the second electrical machine and the output shaft of the combustion engine is connected with said first part.

19. The drive system according to claim 5, wherein the output shaft of the combustion engine, the rotor of the first electrical machine and the input shaft of the gearbox are rotatably arranged around a common rotation axis, and the rotor of the second electrical machine is rotatably arranged around a rotation axis, which is substantially parallel therewith or parallel with said common axis.

20. The drive system according to claim 5, wherein the planetary gear's sun wheel is said first of said components and the ring gear is said third of said components.

* * * * *